United States Patent [19]

Frith et al.

[11] Patent Number: 4,868,856

[45] Date of Patent: Sep. 19, 1989

[54] MULTI-COMPONENT FLOW MEASUREMENT AND IMAGING

[75] Inventors: Barry Frith, Leigh; Adeboye Olatunbosun, Fallowfield, both of England

[73] Assignee: National Research Development Corporation, London, England

[21] Appl. No.: 289,443

[22] Filed: Dec. 22, 1989

[30] Foreign Application Priority Data

Aug. 27, 1985 [GB] United Kingdom ............... 8521287

[51] Int. Cl.⁴ .................... G01N 21/00; G01F 1/00
[52] U.S. Cl. .................................. 378/86; 378/88; 378/89
[58] Field of Search .................. 378/86–89; 250/356.1

[56] References Cited

U.S. PATENT DOCUMENTS 4,228,353 10/1980 Johnson .......................... 250/356.1
4,282,433 8/1981 Löffel ............................. 250/356.1
4,359,638 11/1982 Allport ................................ 378/89

OTHER PUBLICATIONS

Gay, Rodney, Ohkawa, Katsuhiro, Conference: Instrumentation in the Aerospace Industry, vol. 26, Advances in Test Measurement, vol. 17, Proceedings of the 26th International Instrumentation Symposium, Seattle, WA (5–8, May 1980), pp. 253–260.

*Primary Examiner*—Carolyn E. Fields
*Assistant Examiner*—Joseph A. Hynds
*Attorney, Agent, or Firm*—Cushman, Darby & Cushman

[57] ABSTRACT

A method of measurement of mass flow rates of multi-component systems comprises directing gamma radiation from a collimated source onto extended scattering means irradiating the flowing medium with single-scattered gamma photons, detecting scattered photons with wide angle photon energy detectors and computing the flow rates from the component velocities and densities.

2 Claims, 12 Drawing Sheets

Number of iteration is 30

CROSS-SECTIONAL IMAGE OF DENSITY
(CONCENTRATION) DISTRIBUTION

Number of iteration is 48

CROSS-SECTIONAL IMAGE OF DENSITY (CONCENTRATION) DISTRIBUTION

Number of iteration is 30

CROSS-SECTIONAL IMAGE OF DENSITY (CONCENTRATION) DISTRIBUTION

Fig. 19b

MULTI-COMPONENT FLOW MEASUREMENT AND IMAGING

This is a continuation of Application No. 07/129,908, filed Dec. 7, 1987, now abandoned, which is a continuation of application Ser. No. 900,697, filed Aug. 27, 1986 which was abandoned upon the filing hereof.

This invention relates to methods of and apparatus for the imaging and measurement of multi-component systems.

Two or three component flow measurements have become increasingly important in a variety of process and power systems, such as, downhole monitoring of oil, oil-gas, and slurry pipelines; pneumatic conveyors, desalination plants; geothermal power stations and nuclear reactors. This is because of increased demand for flow information, not only under steady operations but also under transient and fault conditions.

An essential feature of multicomponent flow is the presence of moving internal interfaces that make theoretical predictions of flow parameters immensely more difficult than in single-component flow. Thus, measurement is required to provide the information for design, supporting analyses of system behaviour, and also for the control and monitoring of the industrial multi-component systems.

Important parameters required for characterisation of a multi-component flow field are the local and the global (mean) density and velocity. Among the many available techniques, those based on radiation transmission and scattering (neutron, gamma and X-ray) are attractive because they are non-intrusive, reliable and robust. The use of neutrons, however, involves the adventitious activation of the flow, and of parts of the apparatus irradiated by the neutron beam. Long data collection periods, or the use of high neutron fluxes which make the system hazardous and expensive, detract from the potential usefulness of neutrons. Furthermore, X-rays generated by electronic devices suffer from beam intensity and photon energy flucutations, and normal X-ray energies have relatively low penetration through metallic pipe sections. The cumulative effect of these and other short-comings makes the use of neutrons and X-rays unattractive for industrial flow measurements.

Gamma rays from long-lived nuclide sources are emitted at a constant rate. The photon energy, normally, is an order of magnitude greater than for X-rays, giving them increased penetration.

Gamma ray transmission techniques, used widely in medicine and industry, produce relatively poor quality information and rely heavily on beam collimation and focussing, and physical scanning procedures. The present state of the art employs very expensive and cumbersome instrumentation which is not easily adaptable for on-line industrial application.

According to the present invention, there is provided a method of measurement of the mass flow rates, and the reconstruction of the time-averaged cross-sectional distribution of the components of a multi-component flow system comprising irradiating substantially the entire flowing medium with single scattered gamma radiation photons, detecting scattered gamma photons with wide angle photon energy detectors, determining the component velocities and computing the component mass flow rates from their respective density and velocity, and providing an image of the flow cross-sectional density distribution.

The invention will now be particularly described with reference to the accompanying drawings in which.

Figure 1:
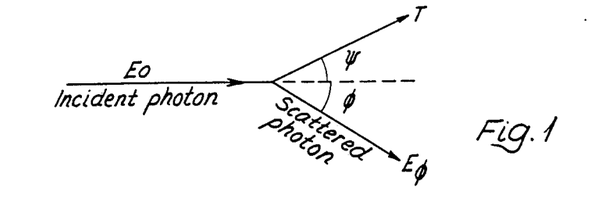
FIG. 1 shows in diagrammatic form the Compton scattering of a photon.
Figure 2:
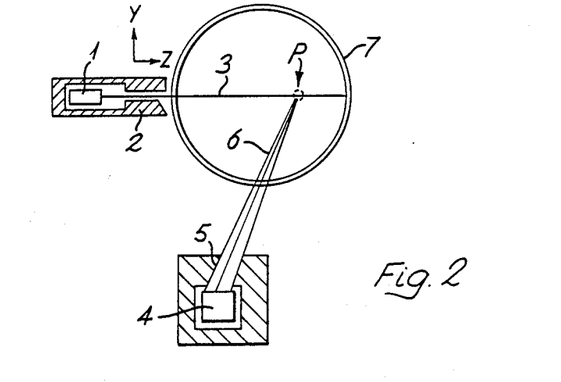
FIG. 2 shows a basic scattering system.

Referring now to FIG. 1 of the drawings, Compton scattering is the process that occurs when a gamma photon collides with a free or loosely bound electron in a material. During this process a photon of energy Eo sets the electron in motion, and the photon is scattered with a reduced energy $E\phi$, through an angle $\phi$ along a well defined path. The relationship between the energy of the incident gamma photon $E_o$ and that of the scattered gamma photons $E_\phi$ is given by:

$$E\phi = \frac{Eo}{1 + \frac{Eo}{MoC^2}(1 - \cos\phi)} \quad (1)$$

where $MoC^2$ is the rest mass energy of an electron, which is 0.511 MeV. The energy transferred to the electron (T) is the difference in energy between the incoming and outgoing photon. To obtain the fraction of the gamma-ray energy scattered in a given direction Klein and Nishina have carried out a quantum-mechanical treatment of the problem using the Dirac equation for the electron and have obtained the equation.

$$I = Io \frac{e^4}{2 Mo^2 C^4 r^2} \frac{1 + \cos^2\phi}{1 + \alpha(1 - \cos\phi)^3} \left(\left|1 + \frac{\alpha^2(1 - \cos^2\phi)}{(1 + \cos^2\phi)[1 + \alpha(1 - \cos\phi)]}\right|\right) \quad (2)$$

Where Io is the intensity of the incident beam of gamma rays, I is the intensity of the scattered beam at the angle $\phi$ and distance r from scattering electron of charge e, and mass Mo, and $\alpha = Eo/MoC^2$. The equations of the cross-section for the number of photons and for the energy scattered per electron and per unit solid angle in the direction $\phi$, could be derived from equations (1) and (2), and are expressed as:

$$\frac{d e\sigma(\phi)}{dw} = \frac{ro}{2} \left(\frac{1}{[1 + \alpha(1 - \cos\phi)^2]} \left|\left[1 + \cos^2\phi + \frac{\alpha^2(1 - \cos\phi)^2}{[1 + \alpha(1 - \cos\phi)]}\right]\right|\right) \quad (3)$$

$$\frac{d e\sigma_2(\phi)}{dw} = ro\left(\frac{1}{[1 + \alpha(1 - \cos\phi)]^2}\left[1 + \cos^2\phi + \frac{\alpha^2(1 - \cos\phi)^2}{[1 + \alpha(1 - \cos\phi)]}\right]\right) \quad (4)$$

where $e\delta(\phi)$ is the cross-section for the number of photons scattered per electron per unit solid angle in the direction $\phi$ and $e\delta(\phi)$ is the cross-section for their energy. The basic scattering densitometer system is as shown schematically in FIG. 2. It comprises a radiation source 1 with a collimator 2 to define a primary radiation beam 3, and a radiation detector 4 with a collimator 5 to define a scattered or secondary radiation beam 6 intersecting the primary beam. Secondary radiation (gamma radiation) is generated along the primary beam path. However, only that radiation generated at P; the point of intersection of the primary and secondary beams is detected.

For a monoenergetic source of uniform photon fluence (Io/A), the single scatter fraction $I_{(\phi)}$ from P reaching the detector collimator is given by:

$$I_{(\phi)} = \frac{1}{\Delta} A \int_{\Delta A} \int_{\Delta Z} \exp[-K_p \int \rho dz]P \int_\phi \frac{d e c}{dw}(E_o, \phi) \quad (5)$$

$$X \exp\left[-K_s \int_P^E \rho dl\right] dwdAdZ$$

where $\Delta A$ is the cross-sectional area of the incident beam (cm$^2$), $\Delta Z$ is the height of the sensitive volume defined by the scattered beam collimator focus (cm), $\rho$ is the flow mean density, $\rho_p$ is the flow density at P, $K_p$ and $K_s$ are the absorption coefficients for the primary and secondary radiations, and the integrals are taken along the primary beam path to the point P and along the entire secondary beam path.

The quantity of interest is the local density $\rho_p$, which cannot be determined without first knowing the values of the integrals or the density at each point along the beam paths, which is both complex and tedious. In an improvement on this basic system a second radiation source emits a second prikmary beam along the same path as the first primary beam but in the opposite direction. A second detector measures the intensity of either one of the primary beams after it traverses the pipe 7. The primary beam detector gives a measurement of the first integral in equation (5). A second modification to this basic system is to use the Compton-scattering effect and to acquire data for all values of $\phi$ simultaneously by using a wide-angle detector that is coupled to a photon energy analyser. That is, if, the primary radiation is gamma photons with known energy, a measurement of the energy of the scattered photon is sufficient to determine the source from which the photon originated from the primary beam, or the value of $\phi$ for that photon. This is effected by removing the collimator around the secondary radiation detector.

With these modifications the determination of the last integral of equation (5) is still very difficult. Furthermore, only a fraction of the flow is interrogated by both the primary and secondary beams. The problem of long data collection periods still exists, because a thin chord of the flow traversed by the primary beam, is the source of the secondary beam. The content of this chord is not known. These difficulties are overcome using a source of externally scattered gamma photons by an embodiment of the invention shown in FIG. 3.

Figure 3:
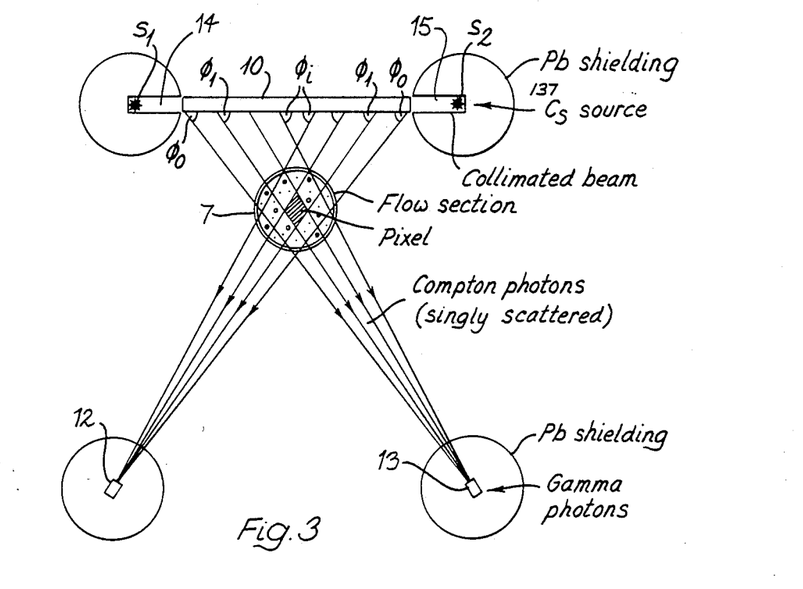
FIG. 3 shows, in diagrammatic form, the arrangement of measuring apparatus in accordance with a specific embodiment of the invention.

A preferred apparatus for imaging and measuring multi-component flow is shown in FIG. 3.

The measurement technique is based on the principle of Compton interaction of gamma photons with matter. In Compton-scattering effect, there is a unique energy versus scattering angle dependence (an intrinsic feature). By this feature the flux of Compton-scattered gamma photons (gammas) coming from a particular scattering location could be determined. The attenuation of this flux is a function of the density of the material it has traversed.

In the measureement system, gamma radiation is generated outside the pipe by focussing two similar monoenergetic radionuclide sources, e.g. (caesium-137 ($^{137}$Cs) energy emission=0.662 MeV) (S1 and S2) onto a homogeneous, low atomic number (Z) material (scatterer). Having two sources, one on each side of the scatterer, and positioning the horizontal flow pipe whose contents are to be interrogated vertically below the scatterer, or vice versa, enables gamma radiation from each source to traverse the entire flow cross-section simultaneously. Therefore, each point in the flow cross-section is interrogated twice. In doing this the flow cross-section is naturally divided into pixels by the finite beam width of the radiation beams. Each pixel gives the local density of the point, (which is the centre of the pixel) in the multi-component flow crosssection under interrogation. The flux of gamma radiation and their energies are detected by two matched detectors (e.g. sodium iodide thalllium NaI (T1) scintillation crystals with their associated photo-multiplier tubes, (D1 and D2) that are coupled to a multichannel analyser (MCA)). The entrance slits to the detectors are wide-angled and configured in such a way that only radiation from a particular source and within a pre-selected scattering angle range is detected.

Because of the random nature of radionuclide emissions, all radiation measurement techniques give time-averaged measurements so as to obtain a good count rate that will minimize inherent statistical errors to an acceptable level. The techniques integrate the density variation of the material in the path of the radiation beam over a period of time. In most cases the integration time depends mainly on the source strength and system geometry.

The time-averaged signal is in two parts: the d.c. or slowly changing component and the a.c. or rapidly changing component. The d.c. component gives the density (concentration) of the material traversed. It also gives an indication of the type of flow regime prevailing during the integration time. The a.c. component is the natural density variation, (flow noise) occurring during the counting period. This flow noise could be used to determine the component flow velocity. This may be achieved by installing two of the measurement systems separated by a known distance along the pipe. The signals from the upstream and downstream measurement systems may either be Fourier analysed to obtain individual flow velocity (time of flight measurement), or time cross-correlation may be performed and the postion of the peaks of the correlograms used to determine individual component velocities.

The obtained densities and velocities could now be used to determine individual component mass flow rates in the multi-component flow. Therefore, time-averaged measurement produces more informative signals. It is non-intrusive and gives a direct, and on-line value of the important parameters needed for full characterisation of a multi-component flow field.

The externally generated Compton-scattering densitometric technique has removed the long counting period drawback associated with internally scattered gamma densitometers. With a 37 GBq source, a statistical counting error of less than 5% and an integration time of a few seconds is practicable. This relatively short counting period now makes it possible to incorporate the new measurement system into any multi-component flow loop without disturbing the flow process overall system response.

In some process and power systems, instantaneous measurement is a necessity. In such applications stronger sources will have to be needed, in order to use this measurement system. Preferably the source strength is comparable with those being used in gamma transmission densitometry, thereby limiting personnel radiation exposure to within the existing legal permissible level.

In this system, (FIG. 3) the Compton-scattering is generated by a homogeneous low atomic number (Z) material 10, (generator) situated outside the flow pipe 7. This arrangement fixes most of the variable parameters in equation (5), it eliminates the need for the second detector; it eliminates the need for point by point determination of the local density along the primary beam, because the singly scattered photons are generated outside the pipe from known scattering positions in the scatterer (generator) and are being used in a transmission mode; it reduces data collection time, because the secondary beam is externally generated from a generator than enhances Compton-scattering; it reduces cost and time, by the removal of the second detector, and the removal of excessive beam collimation and focussing; and it makes it possible to interrogate the entire flow cross-section with the secondary beam. Therefore, equation (5) now becomes:

$$I(\phi) = C(\phi) \exp[-k_s \int \rho d1] \quad (6)$$

where $$C(\phi) = \frac{\rho e}{\Delta A} \int_{\Delta A} \int_{\Delta Z} \exp[-K_p \int \rho e dz] \frac{d e_o}{dw} (E_o, \phi) dw dz dA \quad (7)$$

and e is the electron density at the source of the scatter in the generator (cm$^{-3}$) and $K_p$ is the absorption coefficient in (cm$^2$). $C(\phi)$ is measurable, it is the total count detected to the secondary beam from the genertor (singly scattered photons), before traversing the flow cross-section. $I(\phi)$ is also measurable, it is the count of the singly scattered photons detected after the secondary beam has traversed the flow cross-section.

The integral in equation (6) is now determinable, because the source of the secondary beam which is now stationary could be determined from its detected energies (Compton-scattering).

For a two-component flow mixture (e.g. oil/gas or water/gas) with appreciable difference in component linear attenuation coefficients, an expression for the flow mixture density is:

$$\rho m = \rho g \beta + \rho_1 \times (1 - \beta) \quad (8)$$

where $\rho m$ is the mixture density, $\rho g$ is the gas density, $\beta$ is the gas void fraction and $\rho_1$ is the density of the liquid.

A dimensionless parametewr is obtained by normalising the mixture density with respect to the density of the liquid component.

$$\rho d = \frac{\rho m}{\rho_1} = \frac{\rho g}{\rho_1} + (1 - \beta) \quad (9)$$

Since $g \ll 1$, we assume that the photon attentuation, due to the gas voids is negligible:

$$\therefore \rho d = 1 - \beta \quad (10)$$

Thus the density measurement along a given path (chord) will be conveniently described in the interval $0 \leq \rho d \leq 1$. Substituting $\rho d$ for $\rho$ in equation (6), then:

$$I(\phi) = C(\phi) \exp\left[-K_s \frac{NZ}{A}\right] \int \rho d \, d1 \quad (11)$$

$$\therefore LN \frac{(C(\phi))}{(I(\phi))} = K \times \rho d \, d1 \quad (12)$$

$$= \int \mu d1 \quad (13)$$

where $K = -K_s NZ/A$ and $\mu = K \rho d$

Since the integration is along the path length of a finite width beam, such integration produces the mean density (concentration) of the material traversed. The integration is automatically performed by the measurement system during the ocunting period. Therefore, by this time-average measurement technfique, the concentration of each component in a multi-component flow is determined directly. Time-averaging is a signal enhancement (smoothing) process, that minimises signal noise and in the process improves the signal-to-noise (S/N) ratio. With the new system an integration time of a few seconds, with a statistical counting error of less than 5% is possible.

The configuration of the measurement system enables us to have two image views. Each pixel (voxel) 11 in the flow cross-section under interrogation, is naturally obtained by the crossing in the pipe of the stream of scattered gamma photons from the generator. The value of each pixel is the local density (concentration) for the centre point of the pixel. A set of such values in the multi-component flow mixture cross-section gives the multi-component flow mixture local densities (concentrations).

The image of the time-averaged density (concentration) distribution in the flow cross-section could be obtained from a set of equation (13).

$$\text{i.e. } LN\left(\frac{C_k(\phi_i)}{I_k \phi_i}\right) = \sum_{k=1}^{2} \sum_{j=1}^{N} \mu(i,j) \Delta 1 \quad (14)$$

Because of the limited number of image projections, the preferred image reconstruction technique, that has been implemented and in use is the algebraic image reconstruction technique (ARTZ) of R. Gordon and others described in J. Theoretical Biology (1970) 29 471 (Gordon, R., Bender, R. and Herman, G. T.).

By imposing constraints on the image reconstruction algorith, the cross-sectional concentration distribution of a three component flow (e.g. oil/water/gas) could be obtained provided $\rho d$ max=1.

i.e. $0 \leq \rho d \leq 1$

The ART 2 is an additive algorithm, where $\overline{A}$ represents the reconstruction matrix of point values of $\rho$ and $\overline{A}$ is an auxiliary estimator. Thus, for a given traverse data, we have:

$$A^q(i,j) = \overline{A}^q(i,j) + \frac{P_k(\phi)}{X_k(\phi)Bw} - \frac{R_k(\phi)}{N_k(\phi)} \qquad (15)$$

with constraints:

$$0 \text{ if } \overline{A}^q(k,j) < 0 \qquad (16a)$$

$$A^q(i,j) = \overline{A}^q(i,j) \text{ if } 0 < A^q(i,j) < 1 \qquad (16b)$$

$$1 \text{ if } A^q(i,j) > 1 \qquad (16c)$$

where
q = iteration number.
$R^q$ = ray/sum computed from the reconstruction for ray k at angle $\phi$, $q^{th}$ iteration.
P = measurement data for ray k at angle $\phi$.
N = number of points contained in $k^{th}$ ray at angle $\phi$.
$X_k(\phi)$ = ray k mean free path.
Bw = finite width of ray k.

By installing two of the new measurement systems, 12, 13 a known distance apart on the flow pipe, it is possible to determine the individually component velocity by either performing a time cross-correlation on the natural density variation (flow noise), or by performing an intensity correlation on the detected flux.

The individual component mass flow rates could be computed from their obtained density and velocity values.

Figure 4:
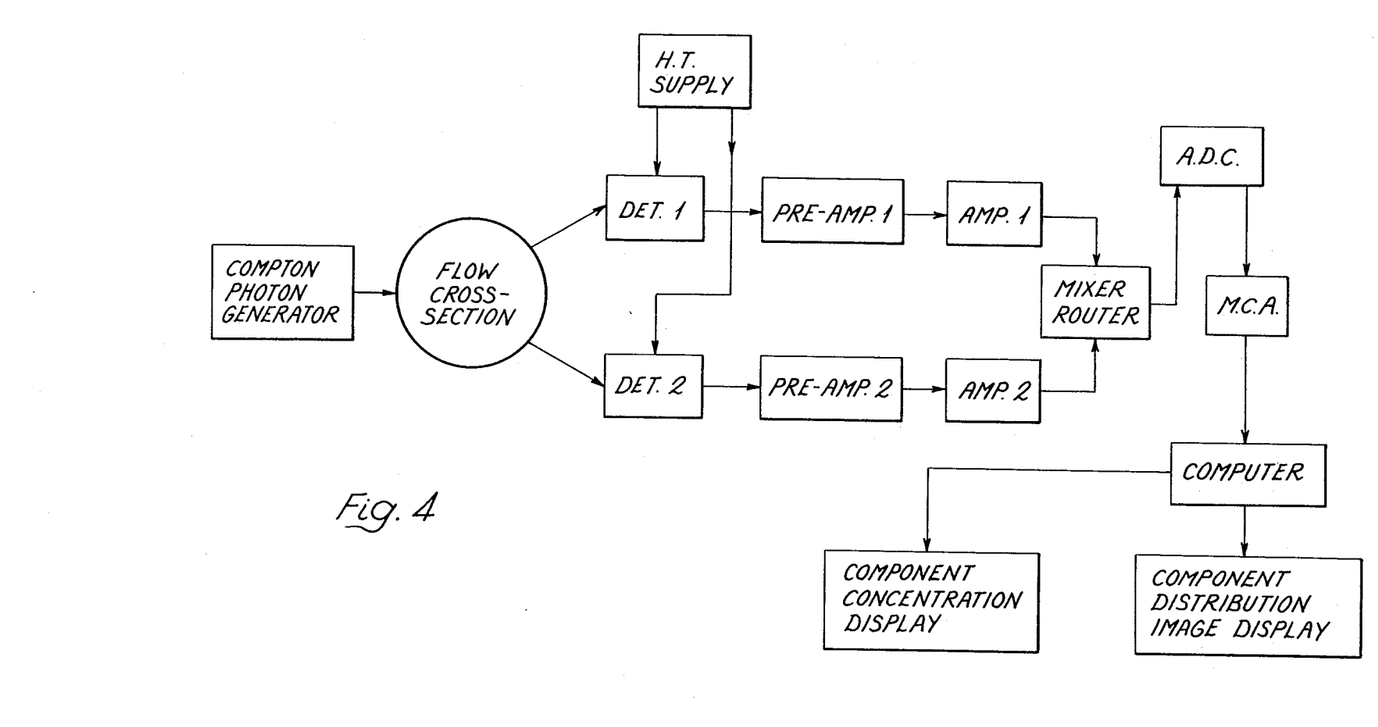
FIG. 4 is a block diagram showing the processing of signals from the detectors of FIG. 3.

The experimental arrangement is shown schematically in FIG. 3. The block diagram representation of the system is shown in FIG. 4.

The system consists of a pair of 1.85 GB1 $^{137}$Cs radionuclide sources S1 and S2 emitting radiation from within lead shielding through the slots. An external scatterer (Compton photon generator) is disposed between these slots. The rod is approximately 146 mm long and each slot is approximtely 8 mm in diameter.

The system also includes a pair of wide-angled photon energy detectors 12, 13 (NAI (T1) detectors) and arranged to receive through slots in the lead shields, 14, 15 singly-scattered gamma photons.

The flow pipe whose contents are to be interrogated, is positioned at right angles to and at a distance from the Compton photo generator so that the secondary beam photons traverse the flow pipe cross-section. The two gamma sources produce streams of scattered photons from the generator (secondary beam). These streams intersect each other in the flow section. Thus a given small area in the flow section is interrogated by two crossing beams of photons, each with known mean energy ($E\phi$, 1). This small area is termed a pixel. The two beams enter their respective detectors 12, 13.

Figure 5:
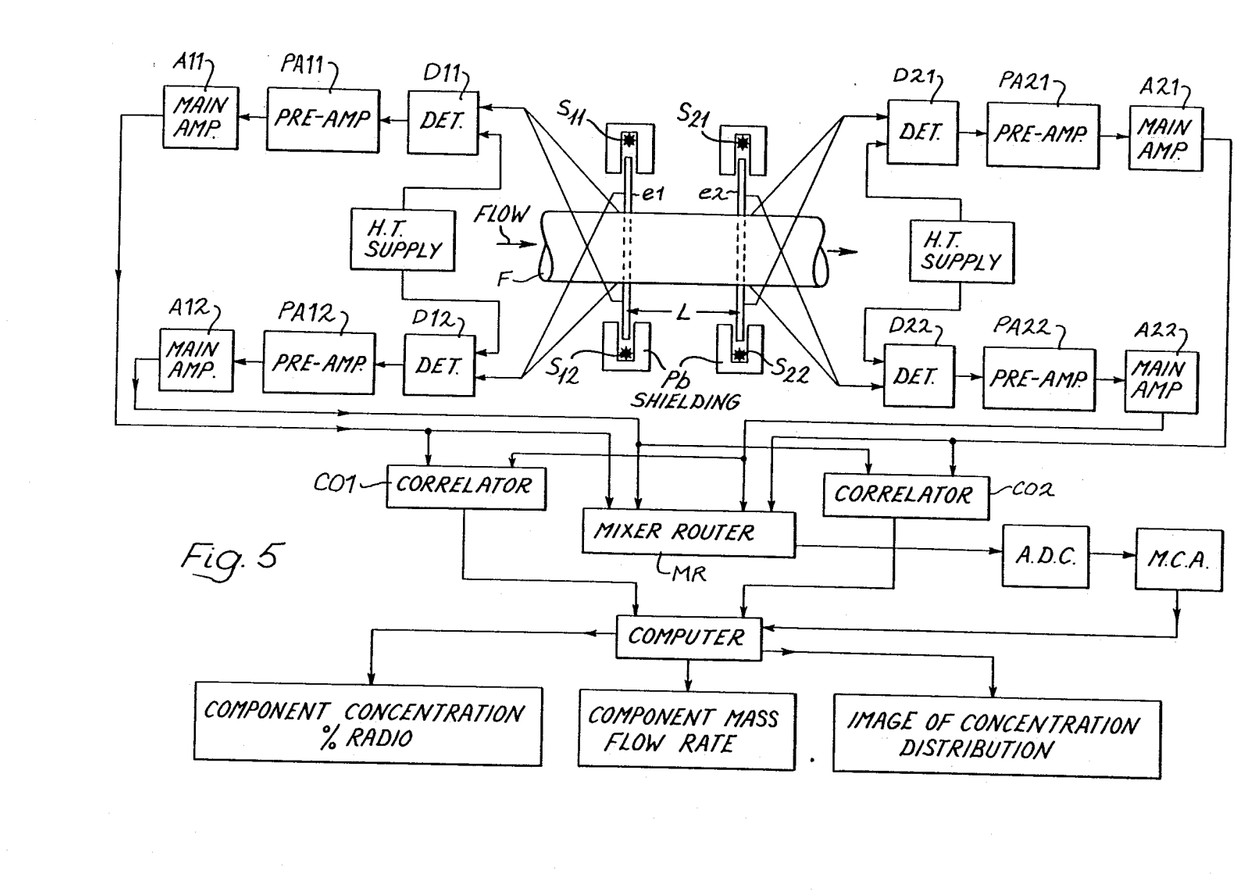
FIG. 5 is an overall system block diagram.

In FIG. 5 gamma radiation from two twin sources $S_{11}, S_{12}, S_{21}, S_{22}$ is directed on to respective Compton scatterers C1,C2 spaced apart by a predetermined distance L. Scattered radiation therefrom irradiates the entire cross-section of a flow pipe F. Radiation further scattered by material flowing down the pipe is detected at different angles by detectors D11,D12,D21,D22, the outputs of which are fed by way of pre-amplifiers PA11,PA12,PA21,PA22, amplifiers A11,A12,A21,A22 and mixer-router MR to an analog/digital converter A.D.C. and multi-channel analyser M.C.A. to a computer C. Correlators C01,C02 also provide inputs to the computer from the detectors. After data analysis, involving an appropriate image reconstruction algorithm, an image of the time-averaged density distribution of the flow cross-section, (e.g. FIGS. 17-19) and the flow component concentrations (e.g. FIGS. 7-16) can be obtained.

The experimental investigations so far have been on stationary materials to simulate known flow conditions. To minimize statistical error in data collection, the counting period was 8000 s. The measurement system confines the singly-scattered photon energies due to $^{137}$Cs to the range 250-450 KeV. Scattered photons (from a $^{137}$Cs source) in this energy range are predominantly singly-scattered, thereby minimising multiple scattering contribution.

Figure 6:
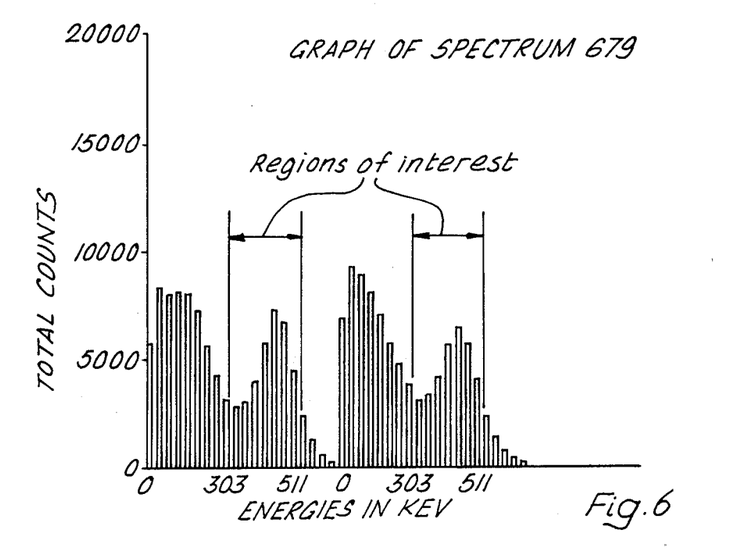
FIGS. 6–16 are graphs showing measurements obtained using the apparatus of FIG. 3, and FIGS. 17–19 are reconstructed images of some flow conditions.
Figure 7:
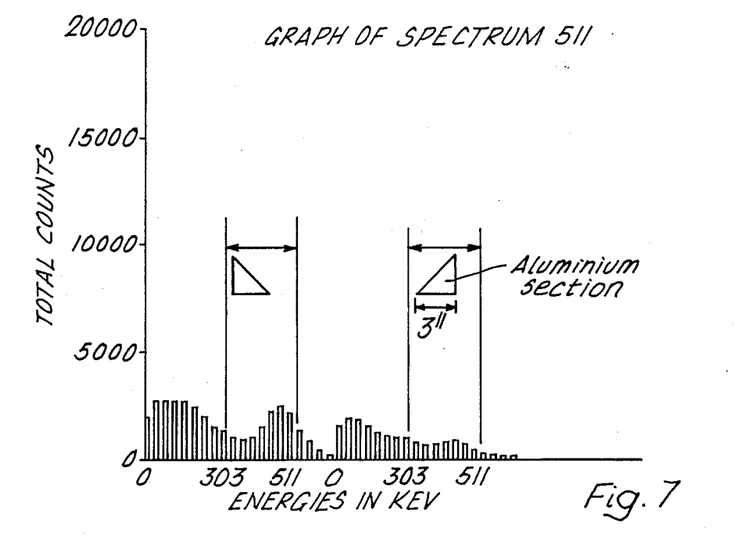
Figure 8:
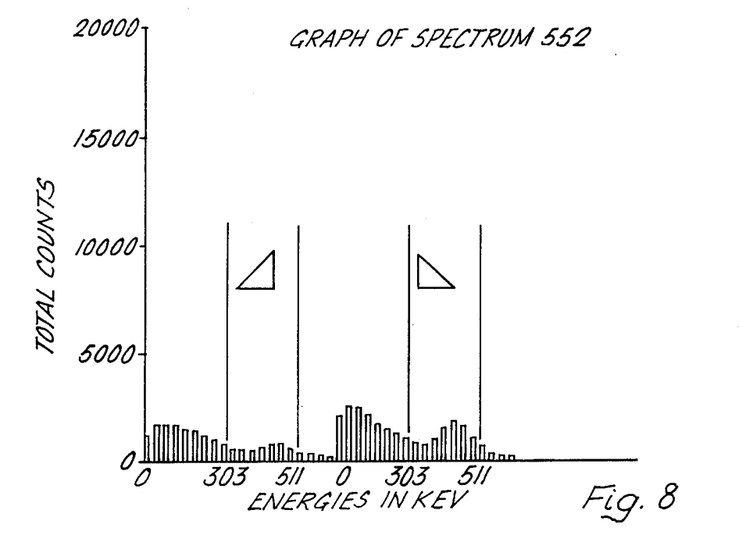
Figure 9:
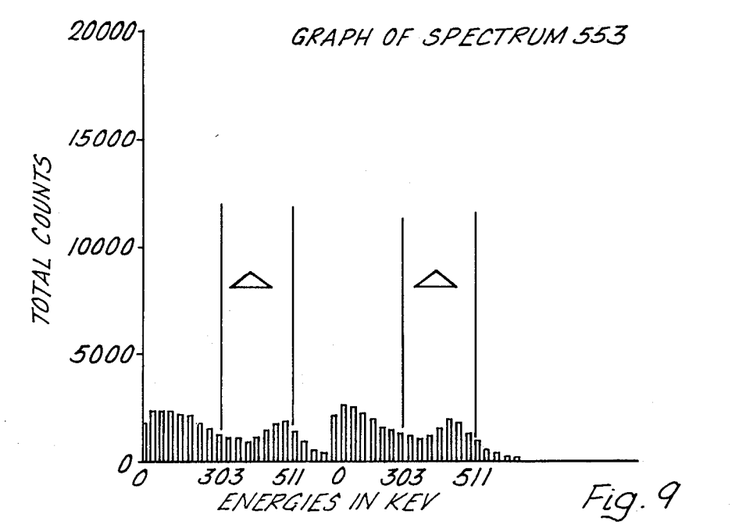
Figure 10:
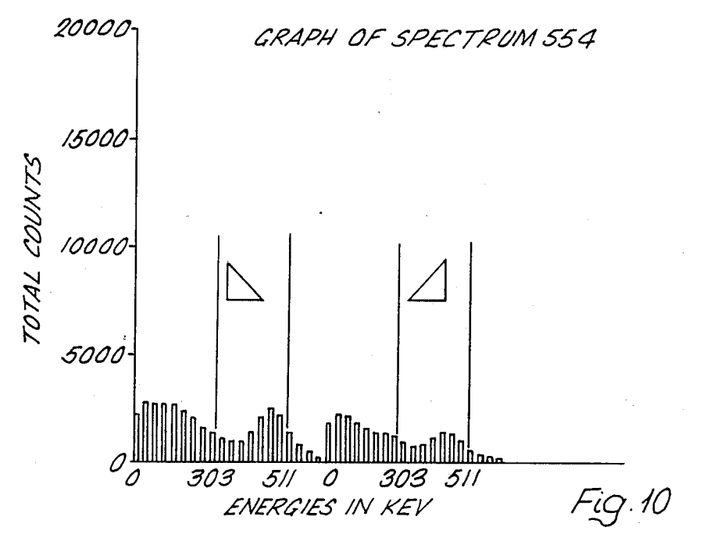

A typical spectrum of Compton-scattered photons is shown in FIG. 6. The singly-scattered photons are within the marked region, and the change in spectrum of this marked region is directly related to the density of the material the photons have traversed.

FIGS. 7-10 are the result of tests carried out to investigate the uniformity of the scattered photons using a triangular aluminum section. These results show that having two similar sources, one each side of the scatterer, a relatively uniform field of singly-scattered photons is generated.

Figure 11:
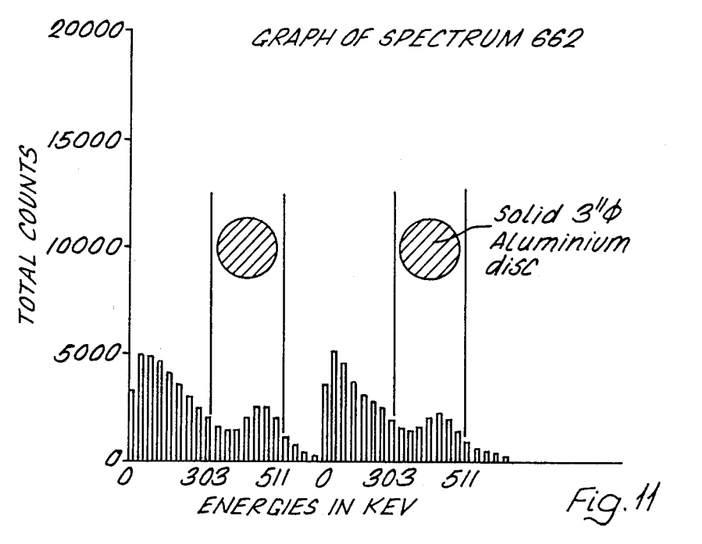
Figure 12:
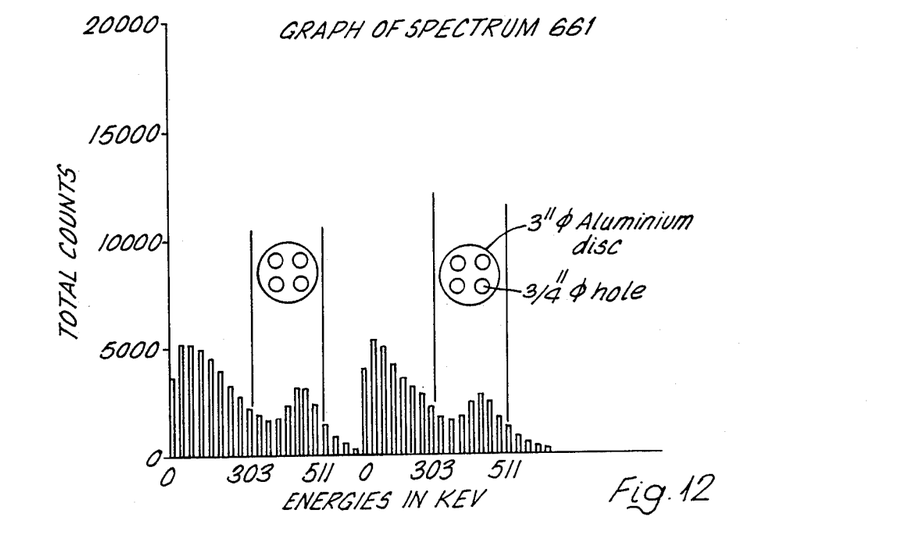
Figure 13:
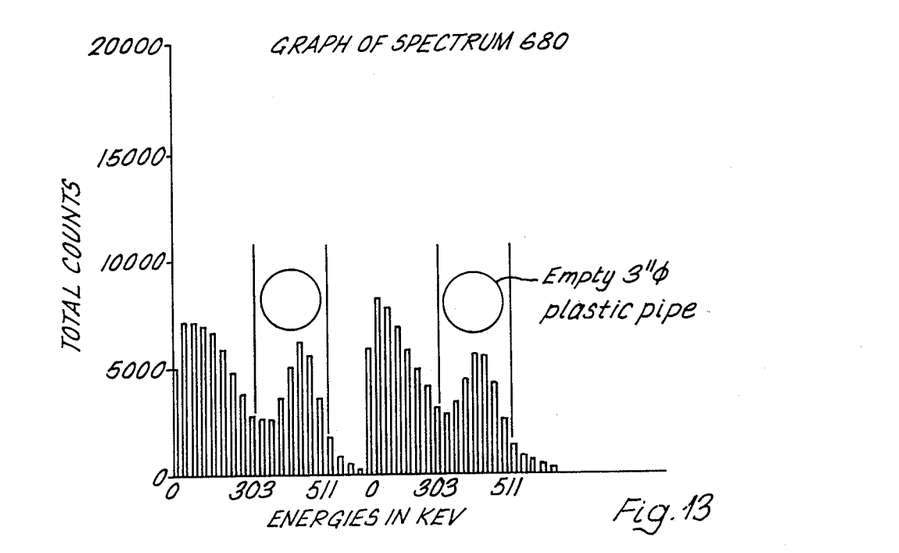
Figure 14:
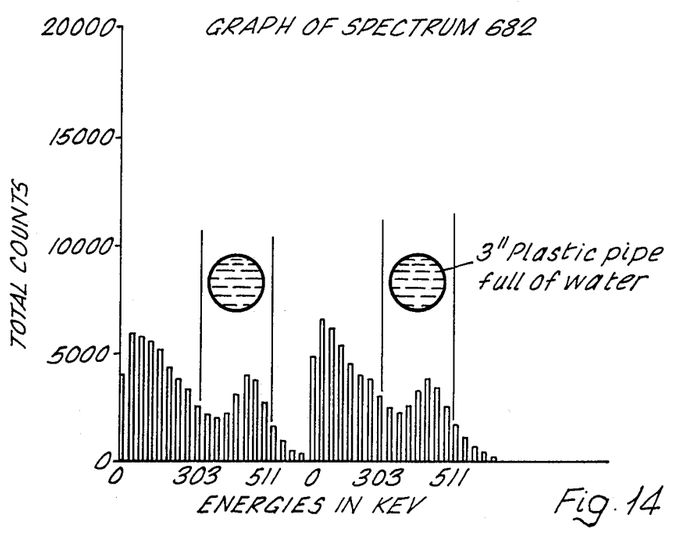
Figure 15:
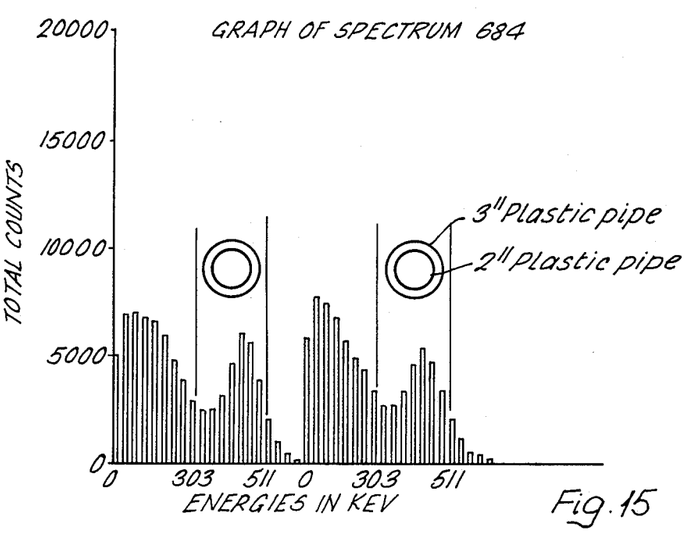
Figure 16:
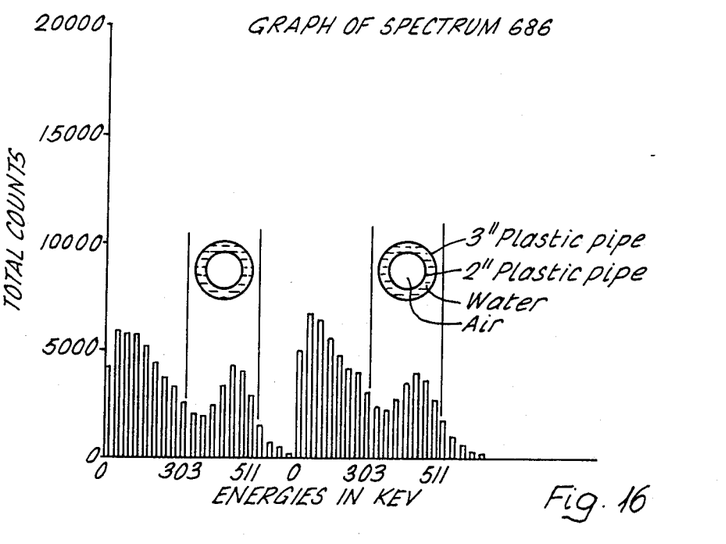

FIGS. 11-12 are the results obtained from stationary materials to simulate known flow conditions.

FIGS. 13-16 are the results obtained from water/air flow conditions in a static mode.

Figure 17A:
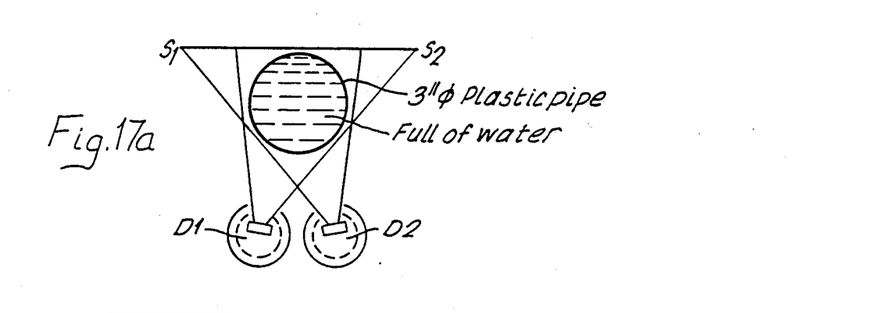
Figure 17B:
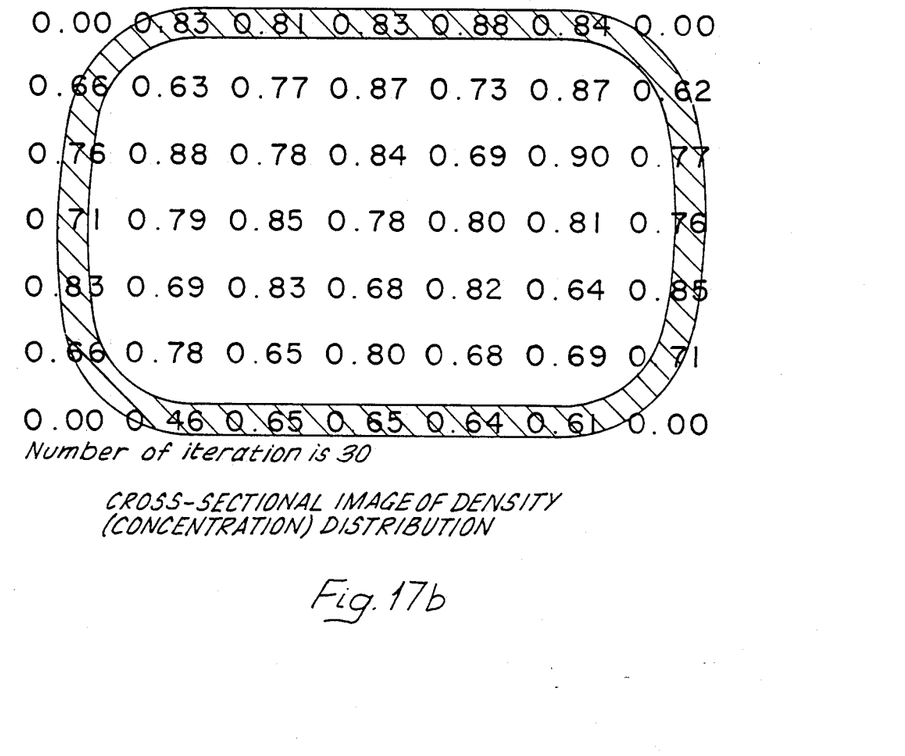
Figure 18A:
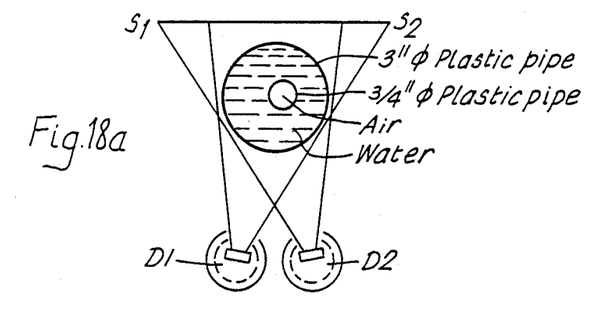
Figure 18B:
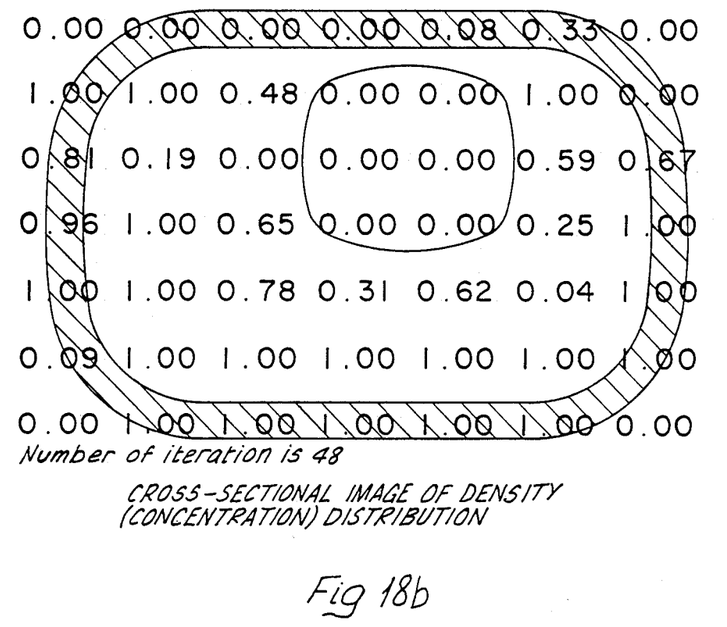
Figure 19A:
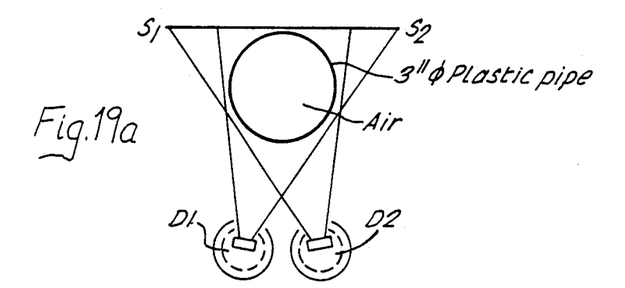
Figure 19B:
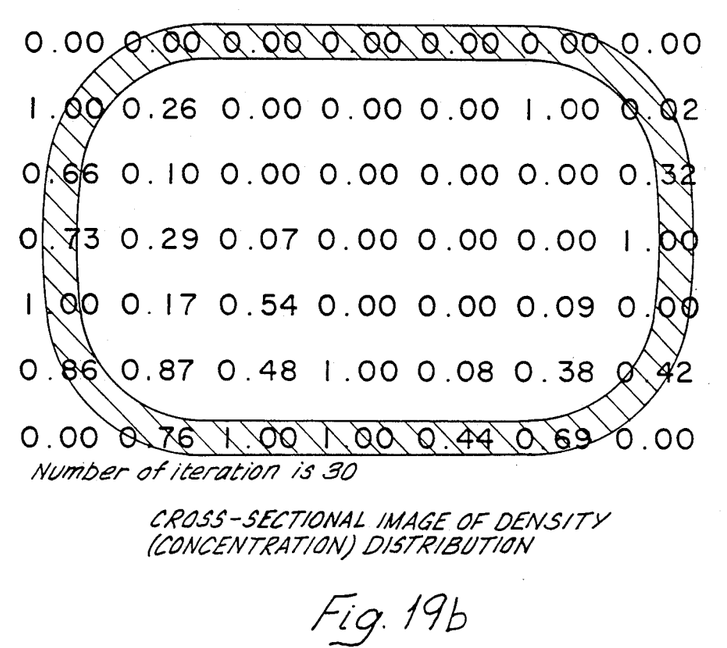

FIGS. 17-19 are reconstructed images for some of the flow conditions shown in FIGS. 13-16.

In addition to the application of the invention to dynamic flow investigation, the evaluation of static materials is equally possible, with application in medicine, etc.

We claim:
1. A method of measurement of mass flow rates and reconstruction of time-averaged cross-sectional distribution of components of a multi-component flow system comprising:
directing gamma radiation from a collimated source onto extended scattering means,
irradiating substantially the entire flowing medium with single-scattered gamma radiation photons scattered by said scattering means,
detecting scattered gamma photons with wide angle photon energy detectors separated by a predetermined distance,
determining density and component velocities,
computing component mass flow rates from the respective density and velocity and
providing an image of flow cross-sectional density distribution.

2. A method of measurement of mass flow rates and reconstruction of time-averaged cross-sectional distribution of the components of a multi-component flow system according to claim 1 characterised in that the source of radiation includes a radionuclide source focussed onto a homogenous low atomic number scattering material.

* * * * *